No. 630,239. Patented Aug. 1, 1899.
J. S. KIDD.
WAGON DUMP AND ELEVATOR.
(Application filed June 6, 1896.)
(No Model.) 5 Sheets—Sheet 1.
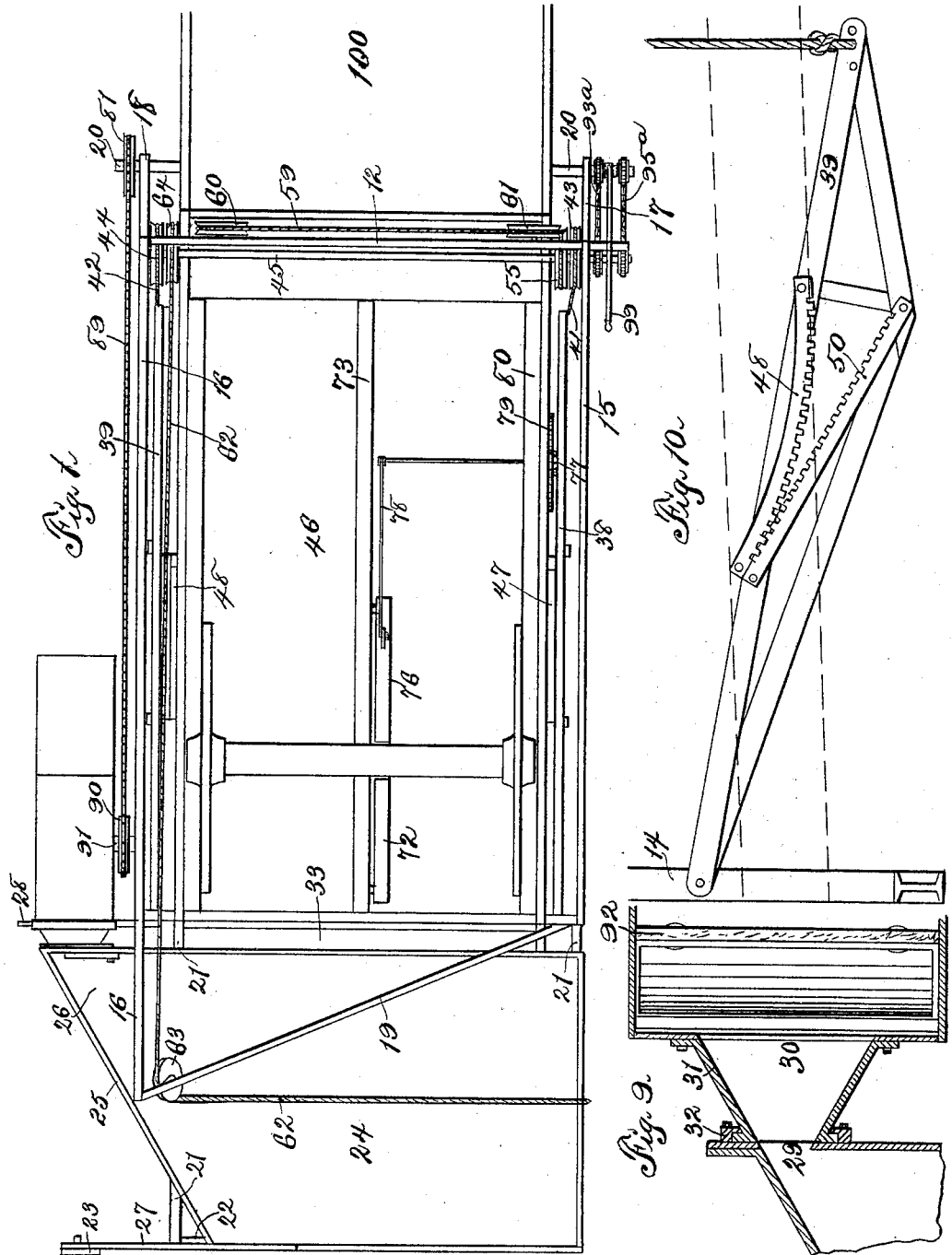

No. 630,239. Patented Aug. 1, 1899.
J. S. KIDD.
WAGON DUMP AND ELEVATOR.
(Application filed June 6, 1898.)
(No Model.) 5 Sheets—Sheet 2.
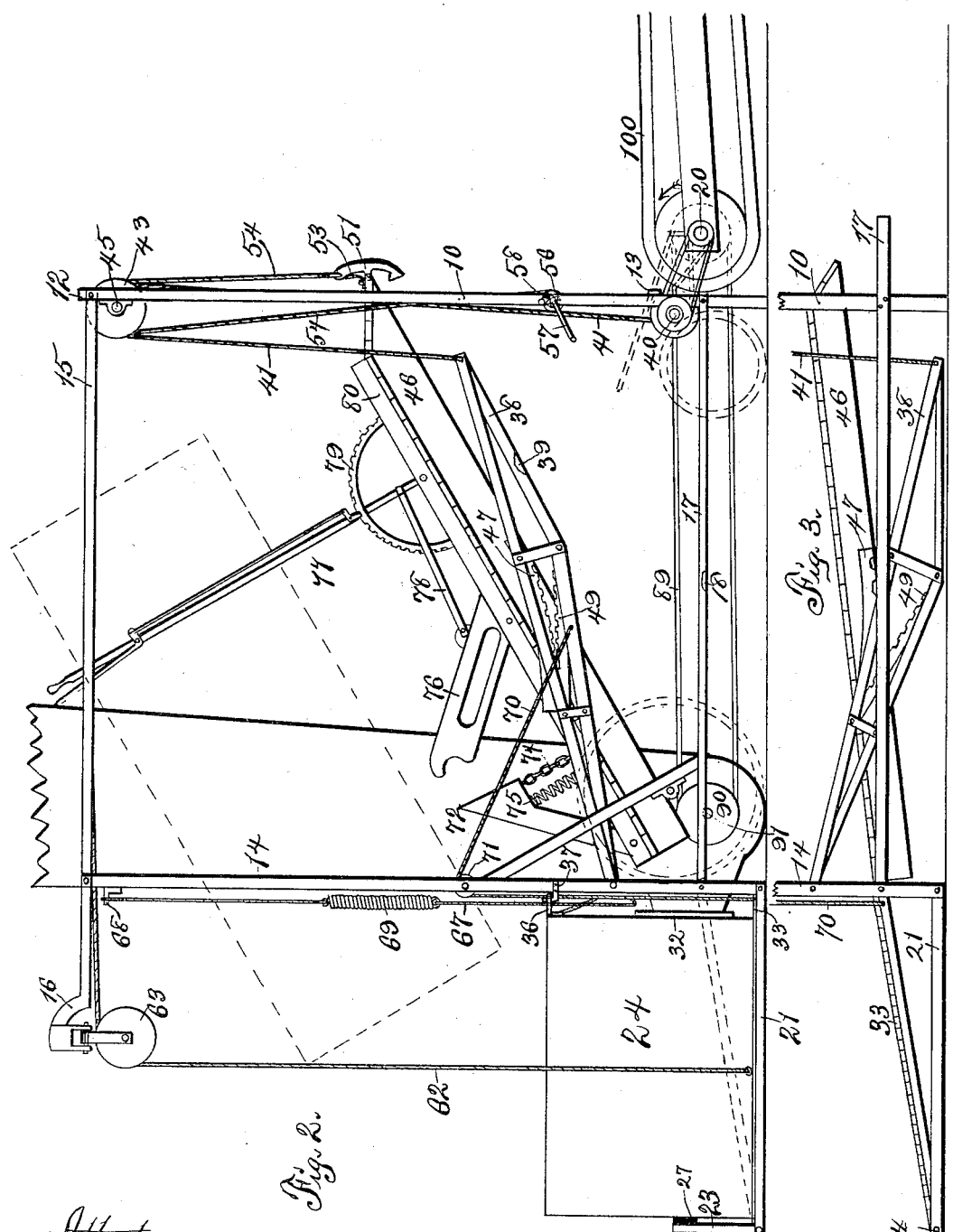

No. 630,239. Patented Aug. 1, 1899.
J. S. KIDD.
WAGON DUMP AND ELEVATOR.
(Application filed June 6, 1896.)
(No Model.) 5 Sheets—Sheet 3.
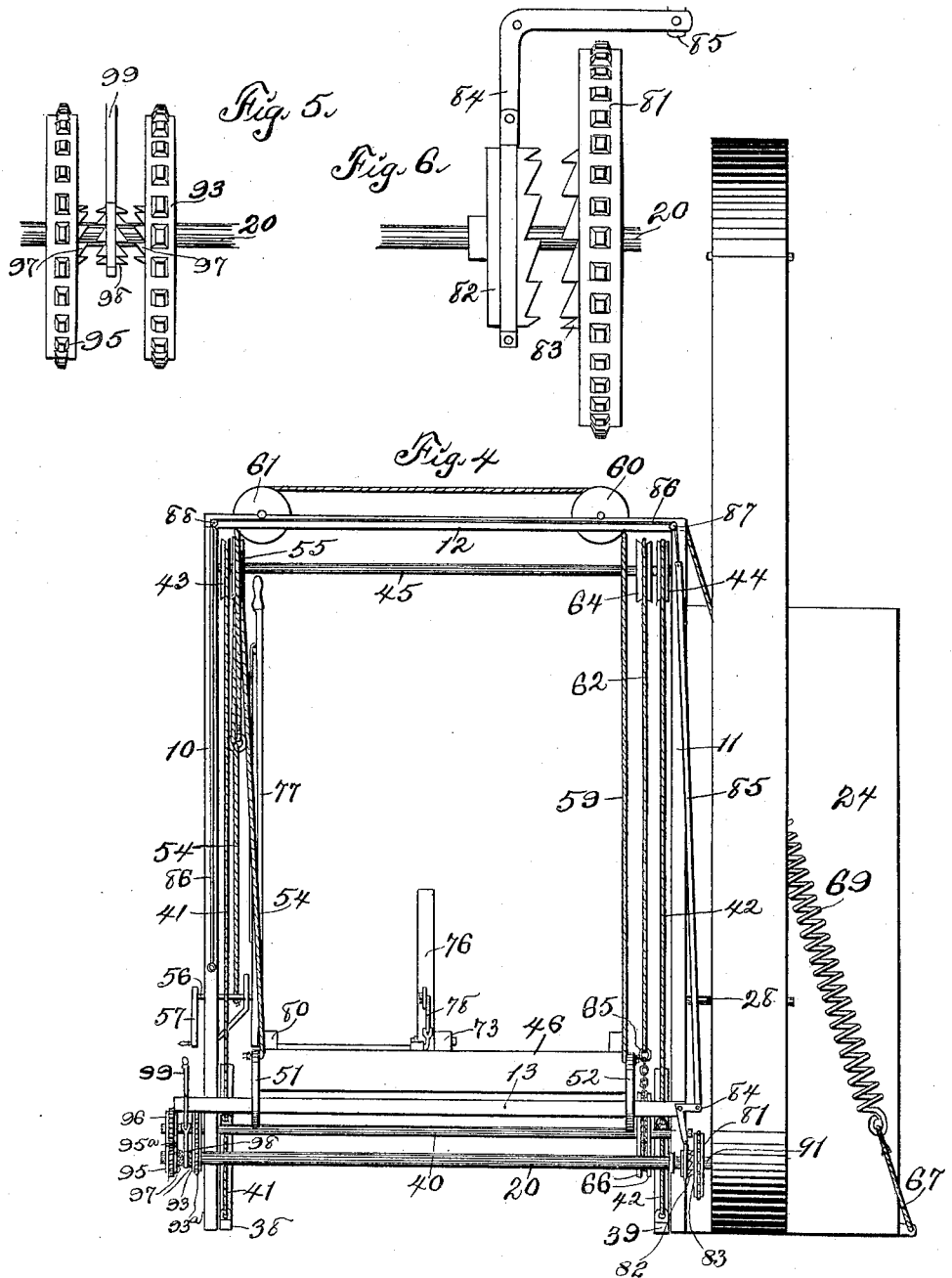

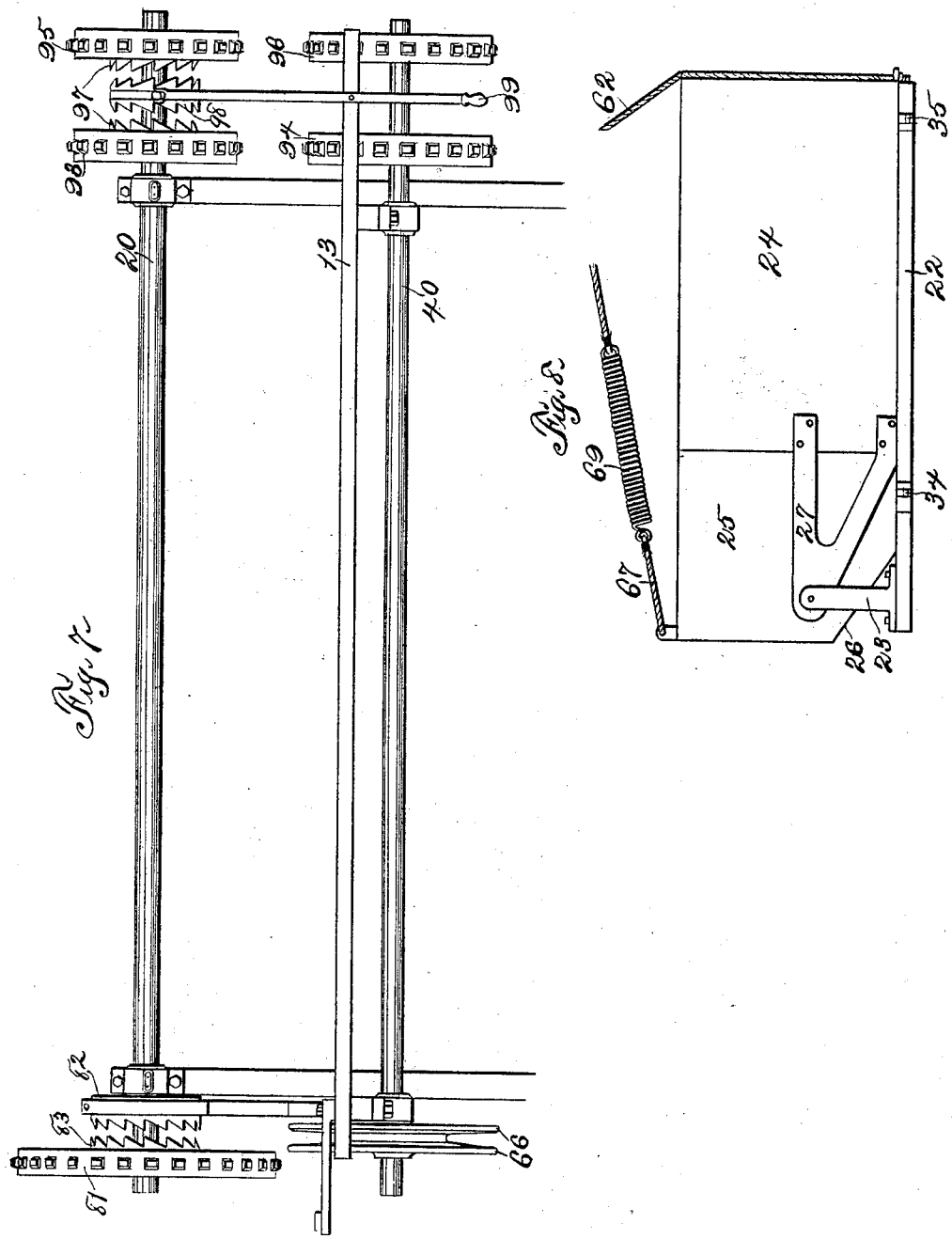

No. 630,239. Patented Aug. 1, 1899.
J. S. KIDD.
WAGON DUMP AND ELEVATOR.
(Application filed June 6, 1896.)
(No Model.) 5 Sheets—Sheet 5.
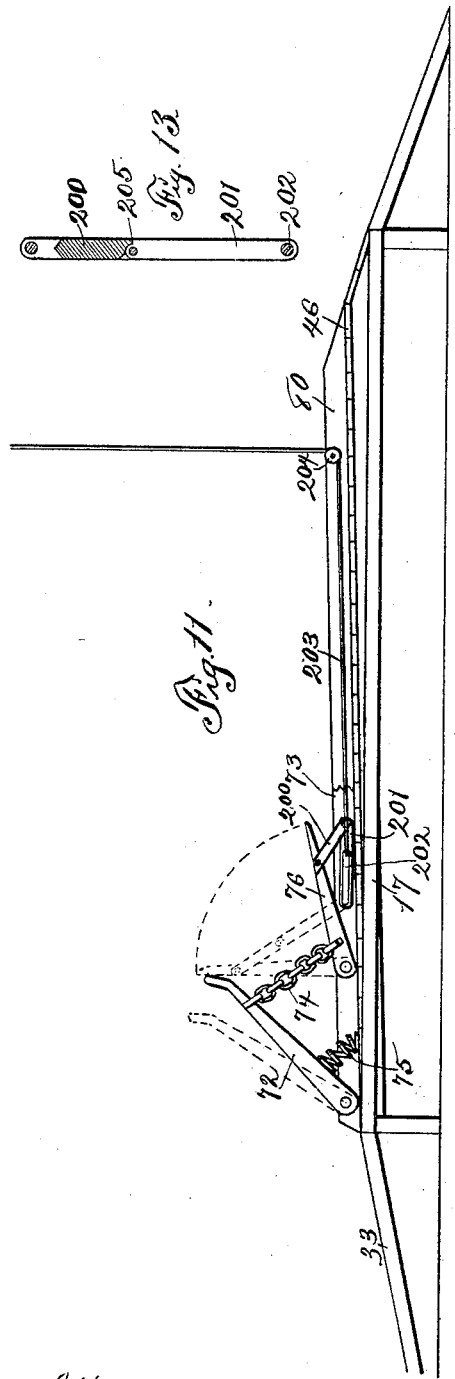
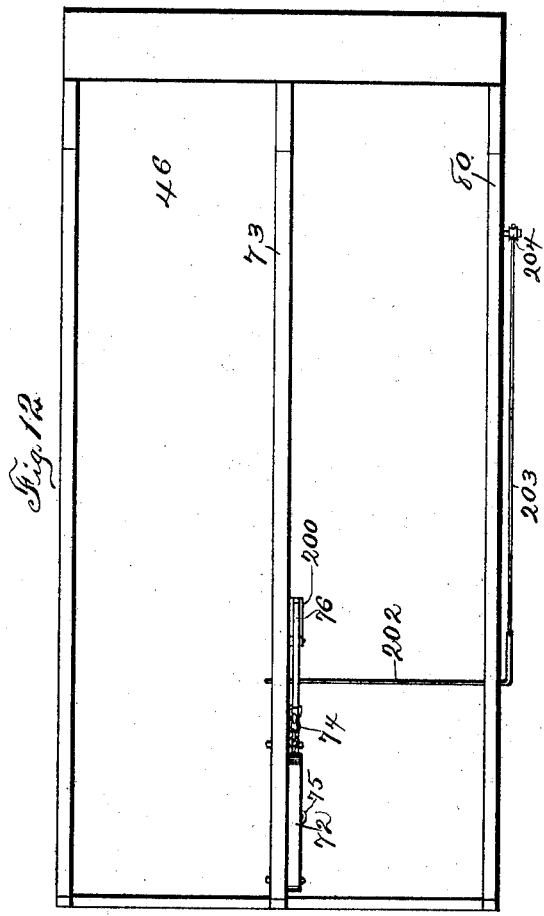

UNITED STATES PATENT OFFICE.

JOHN S. KIDD, OF DES MOINES, IOWA.

WAGON-DUMP AND ELEVATOR.

SPECIFICATION forming part of Letters Patent No. 630,239, dated August 1, 1899.

Application filed June 6, 1896. Serial No. 594,619. (No model.)

*To all whom it may concern:*

Be it known that I, JOHN S. KIDD, a citizen of the United States of America, and a resident of Des Moines, in the county of Polk and State of Iowa, have invented a new and useful Portable Wagon-Dump and Elevator, of which the following is a specification.

The object of this invention is to provide improved means for receiving a loaded wagon, receiving the contents of said wagon, and elevating the contents of said wagon to a point of delivery materially above the top of the wagon.

My invention consists in the combination of a dumping-platform, an approach to said platform, a receptacle located at the rear of the dumping-platform, and means for removing the contents from said receptacle laterally of the machine.

My invention consists, further, in a platform upon which a loaded wagon may be drawn, a receptacle located in the rear of the position of the wagon upon said platform and arranged for oscillation or partial inversion, means for dumping the contents of the wagon into said receptacle, and means for removing the contents of said receptacle laterally of the machine.

My invention consists, further, in a platform upon which a wagon may be drawn while loaded, a receptacle hinged in the rear of said platform and arranged to receive the contents from the wagon, means for tilting said receptacle laterally of the machine, and an elevator arranged to receive the contents from said receptacle and deliver the same at the desired altitude.

My invention consists, further, in the combination of a platform upon which a loaded wagon may be drawn, means for securing said wagon on said platform, and a treadmill arranged to support the team by which the wagon is drawn upon the platform and operated by said team to actuate the mechanism for dumping and elevating.

My invention consists, further, in the construction, arrangement, and combination of elements hereinafter set forth, pointed out in my claims, and illustrated by the accompanying drawings, in which—

Figure 1 is a plan of the machine, portions of the treadmill being removed. Fig. 2 is an elevation of the machine, portions of the treadmill being removed. Figs. 1 and 2 illustrate my machine with the parts in the positions assumed when the contents of a wagon are being dumped into the receptacle. Fig. 3 is an elevation of a portion of the machine, showing the platform in its lowest position and the approach to said platform in position as required to permit a wagon to be drawn upon said platform. Fig. 4 is a front end elevation of the machine, portions of the treadmill being removed and illustrating the machine with its parts in the positions assumed when the contents of the receptacle are being deposited in the elevator-boot and elevator. Fig. 5 is a detail elevation of a portion of the mechanism employed to reverse the direction of rotation of the lifting apparatus. Fig. 6 is a detail elevation of a portion of the mechanism employed to clutch the elevating mechanism to the treadmill. Fig. 7 is a plan illustrating the connections between the treadmill and lifting and elevating mechanisms shown in elevation in part in Figs. 5 and 6. Fig. 8 is a rear elevation of the elevating receptacle. Fig. 9 is a sectional plan in detail showing the connection between the receptacle and the elevator-boot. Fig. 10 is a detail elevation showing the manner of mounting one of the lifting-levers on the frame and the platform thereon and secured thereto by a rocker. Fig. 11 is an elevation illustrating a mechanically-operated chucking device for use on the wagon-platform. Fig. 12 is a plan of a portion of the mechanism shown in Fig. 11. Fig. 13 is a detail sectional elevation of a portion of the chucking device.

In the construction of the machine as shown the numerals 10 11 designate front standards connected at their top by a horizontal bar 12 and near their bottoms by a beam 13.

The numerals 14 designate rear standards connected at their tops and near the bottom in like manner to the front standards. The front standards are connected to the rear standards at their tops by bars 15 16 and at their bottoms or near thereto by bars 17 18.

The bar 16 extends rearwardly from the rear frame or standards and is connected at its outer end by a brace 19, obliquely positioned to the upper end of the standard 14 at the point of connection with the bar 15.

The bars 17 18 extend forwardly from the front standards and support a power-shaft 20. An auxiliary frame is connected to and extends rearwardly from the lower ends of the standards 14 and is composed of side bars 21 and a rear bar 22. A short standard 23 is fixed to and rises from one end of the frame 21, and a receptacle 24 is positioned above and rests upon the auxiliary frame at times. The receptacle 24 is approximately rectangular in form and is provided with one inclined end portion 25 and an inclined bottom portion 26 to form a hopper when said receptacle is turned on one end. A bracket 27 is fixed to the rear face of the receptacle 24 and pivoted at one end to the upper end of the standard 23. An elevator-leg is provided and fulcrumed on a spindle 28, extended laterally from one of the standards 14, and said leg normally is vertically positioned at one side of the machine adjacent to the hoppered end of the receptacle. An aperture 29 is formed in the side of the receptacle adjacent to the elevator-leg and communicates with an aperture 30 in the elevator-boot through a conical connecting section 31, which section is flanged around the aperture 30 and bolted to the elevator-boot and flanged around the aperture 29 and secured to the receptacle by a flanged collar 32, formed in halves overlapping the flange of the section and bolted to the receptacle. By this means a swivel connection is formed between the elevator-boot and the receptacle 24, and the axis of the aperture through said swivel connection alines with the axis of the pivotal connection between the bracket 27 and the standard 23. An approach-platform 33 is pivoted at one end in the auxiliary frame by pivots 34 35 and is of such size as to lie within the auxiliary frame when the receptacle is in the position shown in Fig. 2. An eye 36 is fixed to the receptacle and projects forwardly from one corner thereof, which eye engages, when the box is in position shown in Fig. 2, with a hook 37, fixed to the adjacent standard 14 in alinement with the spindle 28. A pair of levers 38 39 are fulcrumed at their rear ends to the standards 14 and extend forwardly and downwardly therefrom nearly to the standards 10 11. A shaft 40 is positioned transversely of the machine and mounted for rotation in bearings fixed to the standards 10 11 immediately below the beam 13. Ropes 41 42 are connected to the forward ends of the levers 38 39, extend vertically over sheaves 43 44, loosely mounted on a shaft 45, positioned transversely of and fixed to the upper end portions of the standards 10 11, extend downwardly from said sheaves, and are attached directly to the shaft 40.

A dumping-platform 46 is provided and connected to the levers 38 39 by means of rockers 47 48, fixed to said platform and resting on racks 49 50, fixed to the levers at or about the central portions of said levers. Hooks 51 52 are pivoted to the forward corners of the platform 46 and engage when the platform is down with the beam 13, and are held in engagement with said beam by springs 53 impinging against the rear faces thereof. The hook 51 is connected by a rope 54, extending vertically over a sheave 55 on the shaft 45 and downwardly from said sheave to a point of attachment to a shaft 56, mounted in the standard 10 and operated by a winch 57, a ratchet-wheel on said shaft 56 being engaged by a pawl 58 to prevent reverse movement thereof. The hook 52 is connected to the lower end of a rope 59, which rope extends vertically over a sheave 60 on the bar 12, horizontally from the sheave 60 to a sheave 61 on the bar 12, and downwardly from the sheave 61 to a point of attachment to the rope 54 at a distance above the shaft 56. A rope 62 is connected to the free end of the receptacle 24, extends vertically and obliquely to a sheave 63, hinged to the projecting end portion of the bar 16, extends rearwardly from said sheave to a sheave 64 on the shaft 45, extends downwardly from the sheave 64, and is connected to a chain 65, which chain is connected at its lower end to the shaft 40, between a pair of disks 66, in such a manner that the chain will wind upon itself on the shaft between the disks. A rope 67 is connected at one end to the end of the receptacle opposite to the point of attachment of the rope 62 to said receptacle and extends upwardly therefrom to a point of attachment at 68 to one of the standards 14. A retractile coil-spring 69 is interposed between two sections of the rope 67 to permit of a tension expansion of the line formed by the rope and spring. A rope 70 is located on each side of the machine and connects each of the levers 38 39 over sheaves 71 to the forward end of the approach-platform 33. A rear chuck 72 is located on the rear end of the platform 46 and fulcrumed to a beam 73, extending longitudinally of the central portion of said platform. A chain 74 connects the front end of the chuck 72 to the beam 73, and an expansive coil-spring 75 is interposed between the chuck 72 and the platform, which spring tends to elevate the chuck to the limit of movement determined by the chain 74 after said chuck has been depressed by engagement of parts of the wagon approaching the platform. A front chuck 76 is located on the central portion of the platform 46 and fulcrumed to the beam 73 at its forward lower end and when not in use lies upon and parallel with said platform. A hand-lever 77 is fulcrumed, by means of a bell-crank on its lower end portion, to the platform 46, and a connecting-rod 78 joins said lever to the front chuck 76. A rack 79 is fixed to a beam 80, located at one side of the platform 46, and is engaged by pawl devices on the lever 77 to position said lever as desired to retain the chuck 76 inoperative or in such relation to the rear chuck 72 as will prevent movement of a wagon upon the platform.

Referring to Figs. 4, 5, 6, and 7, it will be observed that a sprocket-wheel 81 is mounted on the power-shaft 20 and connected thereto at times by a clutch member 82 on said shaft meshing with a clutch member 83 on the sprocket-wheel. A bell-crank lever 84 is fulcrumed on the beam 13 and engages at one end with the clutch member 82 in such a manner as that when actuated said lever will move said clutch member longitudinally of the shaft 20. A connecting-rod 85 is fixed to the extremity of the horizontal arm of the lever 84 and extends approximately vertically nearly to the top of the machine-frame. A rope 86 is connected at one end to the upper end of the rod 85 and extends vertically over a sheave 87 on the bar 12, horizontally along said bar and over a sheave 88 at the opposite end thereof, and thence downwardly into proximity with the winch 57. A sprocket-chain 89 connects the sprocket-wheel 81 with a sprocket-wheel 90 on the inner end of a shaft 91, which shaft is positioned transversely of the lower end of the elevator-leg and carries a drum to support and operate a bucket elevator 92, traveling in said leg. A sprocket-wheel 93 is mounted loosely on the power-shaft 20 and is connected by a straight sprocket-chain with a sprocket-wheel 94 on the shaft 40. A sprocket-wheel 95, loosely mounted on the power-shaft 20, is connected by a twisted sprocket-chain to a sprocket-wheel 96 on the shaft 40. Each of the sprocket-wheels 93 95 is provided with clutch members 97, arranged to be engaged by a clutch member 98, provided with a double face and mounted for movement longitudinally of but non-rotatably on the shaft 20. The clutch member 98 is controlled by a hand-lever 99, fulcrumed on the beam 13.

The power-shaft 20 is rotated in the direction of the arrow in Fig. 2 by a horse-power 100, connected with said shaft and operated by the draft of horses carried thereon and pulling against the wagon when said wagon is chucked immovably on the platform 46, the details of construction and operation of said horse-power not being shown nor described in this application.

In the practical operation of this invention the members are positioned, as shown in Figs. 3 and 4, with the elevator-leg upright, the receptacle 24 on one end parallel with the elevator-leg, the levers 38 39 down, the platform 46 down, the approach 33 elevated, and the front chuck 76 in its lowest position. A loaded wagon is drawn upon the platform 46, depresses the chuck 72, and is advanced until the horses drawing the same stand upon the horse-power 100, and the chuck 72 rises at the rear of the rear axle of the wagon. The wagon is then backed into engagement with said chuck, and the chuck 76 is raised into the position shown in Fig. 2 by manual operation of the lever 77 and retained in said position by engagement of the pawl devices on said lever with the rack 79. The sprocket-wheel 81 is at this time idle by reason of the disengagement of the clutch member 82 through the gravity of the connecting-rod 85 acting upon the horizontal arm of the lever 84. The lever 99 is then manipulated to engage the clutch member 98 with the clutch member 97 on the wheel 93, and the horses on the horse-power are started to operate said horse-power and rotate the shaft 20. The rotation of the shaft 20 rotates the clutch member 98, wheel 93, wheel 94, and shaft 40, and in so doing winds the cables 41 42 on the shaft 40 to elevate the levers 38 39, platform, and wagon and unwinds the cable 62 and permits the descent of the receptacle 24 into the position shown in Figs. 1, 2, and 8, the initial movement of descent being imparted to the receptacle 24 by contraction of the spring 69, acting through the ropes 67 to move said receptacle past the dead-center thereof. The box descends to its lowest point coincident with the ascent of the levers into the position shown in Fig. 2, and at the same time the approach-platform 33 descends under the control of the cables 70, relaxed by the elevation of the levers 38 39. The winch 57 is then manually operated to wind up the cable 54, thus exerting a draft on the hooks 51 52, whereby said hooks are released from the beam 13 and elevating the front end of the platform 46 into the position shown in Fig. 2, the said platform tilting on the rockers 47 48, and raising the wagon somewhat higher in so doing, until the rear end of the wagon-box projects over and above the receptacle 24, as shown by dotted lines in Fig. 2. The tailgate of the wagon-box is then opened and the contents of said box run by gravity into the receptacle 24. When the wagon-box is empty, the winch 57 is manually moved reversely to reposition the wagon in a forwardly-inclined position, so that the front end of the platform 46 rests on the beam 13 and the hooks 51 52 engage said beam. The lever 99 is then manipulated to cause the clutch member 98 to release the clutch member on the wheel 93 and engage the clutch member on the wheel 95, the horse-power is operated to revolve the shaft 20, the rope 86 is pulled down and held manually to clutch the sprocket-wheel 81 to the shaft, and the motion of said shaft is communicated to the elevator 92 to raise the grain through the elevator-leg and is communicated to the shaft 40 reversely to the first movement to descend the levers 39 38 and elevate the receptacle 24 and approach-platform 33. When the receptacle 24 has reached its highest or "on-end" position, the grain has been received and elevated through the elevator-leg and the horse-power may be stopped, the front chuck 76 placed in its down position, and the wagon withdrawn over the horse-power and a departure-platform, (not shown,) leaving the machine in position for another load to be driven thereon and elevated. It will be observed that immediately upon the release of the manual force from the rope 86 the weight of the connecting-rod 85 immediately disengages the clutch of the sprocket-wheel 81 and the elevator stops until again manually placed in position for operation. It will be observed that when the receptacle 24 is in its upward position it is retained by drawing the rope 62 taut and that the spring 69 is distended and has stored therein power to overcome the dead-center and cause an initial movement of descent of the box when the rope 62 is relaxed. The ropes 70 should be slack when in the position shown in Fig. 2 in order that the approach-platform 33 will not commence to rise until the receptacle 24 has been elevated sufficiently not to be engaged thereby.

When it is desired to transport the machine, the receptacle is let down until the eye 36 engages the hook 37, the platform and levers are detached therefrom and let down, the elevator-leg is tipped forwardly and rotates downwardly on the pivot 28, elevating the receptacle on a pivot formed by the eye 36 and hook 37, the horse-power is turned vertically and secured to the top of the frame, and the departure-platform hangs suspended from the upper end of the horse-power. The machine may then be transported on the wheels shown by dotted lines in Fig. 2. The frame of the rear platform 33 may be pivoted to the standards 14 and turned upwardly and secured to the receptacle 24 for transportation, if desired.

In the construction of the device as shown in Figs. 11, 12, and 13 the rear chuck 72 is connected to the front chuck 76 by the chain 74, attached near the upper end of the rear chuck and near the lower end of the front chuck. The front chuck 76 normally lies almost parallel with the platform 46, and the chuck 72 is held in the position shown by the spring 75, which is shown in its normal position and may be expanded or contracted. A crank-shaft 202 is fulcrumed in the beams 73 80, and a connecting-rod formed in sections 200 201 is fixed to said crank-shaft by a rigid connection with the lower end of the section 201, the upper end of the section 200 being pivoted to the chuck 76 near the outer end thereof. The sections 200 201 of the connecting-rod are hinged as follows: The lower end of the section 200 is bifurcated, Fig. 13, and the upper end of the section 201 is inserted therein and secured by a pin transversely seated in both sections, shoulders 205 on the sections engaging when said sections are in alinement to prevent flexure of the hinge in one direction. The outer end of the crank on the crank-shaft 202 is connected to one end of a rope or wire 203, which extends forwardly under a pulley 204 and thence vertically to some point of support (not shown) within easy reach of the operator of the machine or the driver of the wagon.

In practical use the chucks normally occupy the positions shown in Fig. 15. The wagon advances until the rear axle engages, depresses, and passes the chuck 72, compressing the spring 75 slightly in so doing. The spring 75 raises the chuck 72 slightly at the rear of the rear axle. The wagon is backed and the rear axle engages the chuck 72 and raises the same rearwardly into the position shown by dotted line. Simultaneously therewith the chuck 76 is raised by the chain 74 into the position shown by dotted lines and alines the sections 200 201 of the connecting-rod in such a manner as to brace the chuck 76 in a vertical position. The shoulders 205 of the connecting-rod engage to prevent downward flexure of the hinge therein, thus locking the chuck 76 in a vertical position, and the crank-shaft 202 is rocked rearwardly by the actuation of the section 201 of the connecting-rod until the crank is in a vertical position. The wagon is now chucked by limitation of the forward and rearward movement of the rear axle thereof, and when it is desired to remove the wagon from the platform draft is applied to the wire 203 to reposition the crank of the shaft 202 in a horizontal plane, flex the hinge of the connecting-rod, and permit the downward movement of the chuck 76 and forward movement of the chuck 72, the spring 75 contracting slightly and exerting a slight pulling influence on the chuck 72.

I claim—

1. In a wagon-dump and elevator, the combination of a frame, a tilting platform in said frame, an approach-platform to the tilting platform, a receptacle hinged at the rear of the tilting platform and means for elevating and tilting the platform, means for tilting the receptacle and means for receiving and elevating the contents of said receptacle.

2. In a wagon-dump and elevator, a main platform, means for elevating and means for tilting said platform, means for approaching a wagon to and removing said wagon from said platform, a bucket elevator, a receptacle having a capacity of one or more loads of grain, which receptacle is positioned at the rear of said platform and arranged to be tilted from a recumbent position while receiving grain at the rear of said platform to an upright position while delivering grain to one side of said platform and means for tilting said receptacle.

3. In a wagon-dump and elevator, a receptacle located and hinged at the rear of the dumping apparatus and having a capacity of one or more loads of grain, an elevator-leg, a bucket elevator in said leg and communication between said receptacle and leg whereby when the receptacle is tilted the grain will be discharged into said leg.

4. In a wagon-dump and elevator, a receptacle arranged at the rear of the wagon-platform and hinged for oscillation from a recumbent to an upright position or the reverse.

5. In a wagon-dump and elevator, a frame, a wagon-platform on said frame, a receptacle hinged at the rear of said frame, pulleys on said frame and ropes connecting said receptacle, frame and pulleys whereby the receptacle may be oscillated upward and downward as desired.

6. In a wagon-dump and elevator, bucket elevating mechanism, a receptacle arranged for oscillation and mechanism whereby the receptacle may be oscillated coincident with the elevation of grain by the elevating mechanism.

7. In a wagon-dump and elevator, a pivoted elevator-leg, a bucket elevating mechanism in said leg, an ingress-port to said leg, a receptacle fixed to the leg and swiveled around said ingress-port and mechanism for gradually elevating said receptacle in a rotary path at the time the grain is flowing from the receptacle into the leg and being elevated.

8. In a wagon-dump and elevator, means for gradually tilting or dumping the wagon, a hinged receptacle arranged transversely of the wagon to receive grain therefrom, tilting mechanism for oscillating said receptacle laterally of the wagon and bucket elevating mechanism for receiving and elevating said grain.

9. In a wagon-dump and elevator, a wagon-platform, chucking mechanism whereby the wagon temporarily is retained against forward or rearward movement upon said platform, a horse-power treadmill adjacent to said platform and driven by the horses in pulling against the resistance of the chucked wagon.

10. In a wagon-dump and elevator, a support, a wagon-platform fulcrumed on said support and arranged to carry the entire wagon and means for lifting one end of said platform, the rear end of said platform being retained against descent.

11. In a wagon-dump and elevator, a support, levers fulcrumed in said support, means for elevating said levers, a wagon-platform fulcrumed on said levers, means for oscillating said wagon-platform, chuck mechanism for retaining a wagon on said platform, a receptacle to receive and mechanism for elevating the grain and a treadmill horse-power geared to the elevating mechanism, the receptacle and the levers and operated by horses pulling against the resistance of the chucked wagon.

12. In a wagon-dump and elevator, a frame, a wagon-platform in said frame, an elevator-leg at one side of said frame, a receptacle at the rear of said platform and pivoted to the frame and to the elevator-leg by one end, rope-and-windlass mechanism connected with the end of the receptacle opposite to the pivotal point whereby said end of the receptacle may be moved upwardly through an arc, a rope connecting the pivoted end of the receptacle with the frame and a spring in said rope whereby when the receptacle is on end and the strain of the rope-and-windlass mechanism is released said spring will reversely initially oscillate said receptacle.

13. In a wagon-dump and elevator, an elevator-leg pivoted above its bottom, a receptacle hinged to said elevator-leg and hinged to a supporting-frame coincident with the pivotal axis of the elevator-leg whereby when the elevator-leg is oscillated the receptacle is oscillated.

14. In a wagon-dump and elevator, a wagon-platform, an approach-platform, levers carrying the wagon-platform and arranged to be raised and lowered and connections between the approach-platform and levers whereby when the levers are operated the approach-platform also is operated in inverse order thereto.

15. In a wagon-dump and elevator, a wagon-platform arranged for oscillation, a chuck 72 fulcrumed on said platform, an expansive spring acting to elevate said chuck relative to said platform and a chain 74 limiting the elevation of said chuck.

16. In a wagon-dump and elevator, a wagon-platform arranged for oscillation, a chuck 76 fulcrumed thereon, a hand-lever whereby said chuck is oscillated relative to the platform and means for locking said hand-lever.

17. In a wagon-dump and elevator, a wagon-platform arranged for oscillation, a chuck fulcrumed on said platform and arranged to rise mechanically at the rear of the rear axle of a wagon on said platform, a front chuck fulcrumed to said platform and manually-operated mechanism acting on said front chuck to raise and lower the same in a plane in front of said rear axle when desired.

JOHN S. KIDD.

Witnesses:
S. C. SWEET,
G. M. MELICK.